United States Patent
Huntzicker et al.

(10) Patent No.: US 9,684,168 B2
(45) Date of Patent: Jun. 20, 2017

(54) APPARATUS FOR DIGITAL PROJECTION USING HOLOGRAPHIC TECHNIQUES

(71) Applicant: GM GLOBAL TECHNOLOGY OPERATIONS LLC, Detroit, MI (US)

(72) Inventors: Fred W. Huntzicker, Ann Arbor, MI (US); James N. Nickolaou, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 14/091,618

(22) Filed: Nov. 27, 2013

(65) Prior Publication Data

US 2015/0146270 A1    May 28, 2015

(51) Int. Cl.
   *G02B 27/01* (2006.01)
   *G03H 1/26* (2006.01)
   *G02B 26/00* (2006.01)

(52) U.S. Cl.
   CPC .......... *G02B 27/0103* (2013.01); *G03H 1/26* (2013.01); *G02B 26/00* (2013.01); *G02B 2027/0105* (2013.01); *G03H 2001/262* (2013.01); *G03H 2001/2655* (2013.01); *G03H 2227/03* (2013.01)

(58) Field of Classification Search
   CPC ............ G02B 27/01; G02B 27/0103; G02B 2027/0141; G03H 2001/0088; G03H 2227/02; G03H 2240/62
   USPC .................................. 345/7–9, 418
   See application file for complete search history.

(56) References Cited

U.S. PATENT DOCUMENTS

| | | |
|---|---|---|
| 8,398,243 B2 | 3/2013 | Renaud-Goud |
| 8,816,995 B2 | 8/2014 | Geyl |
| 2007/0057781 A1* | 3/2007 | Breed .............. B60K 35/00 340/457.1 |
| 2014/0192173 A1 | 7/2014 | Yu et al. |

FOREIGN PATENT DOCUMENTS

| | | |
|---|---|---|
| CN | 2079790 | 6/1991 |
| CN | 101371204 | 2/2009 |
| CN | 102654697 | 9/2012 |
| CN | 102939577 | 2/2013 |
| CN | 203063693 | 7/2013 |

OTHER PUBLICATIONS

China Patent Application No. 201410694160.0 Office Action issued Jan. 22, 2016 (GM30001CN), 9 pages.
China Patent Application No. 201410694160.0 Office Action issued Oct. 17, 2016, 9 pages (GM30001CN).

* cited by examiner

Primary Examiner — Jennifer L. Doak
(74) Attorney, Agent, or Firm — Cantor Colburn LLP

(57) ABSTRACT

An apparatus for generating and displaying a projected digital image includes an actuator, a holographic encoded medium with a holographic pattern, a light source, and a controller. The holographic encoded medium is disposed in operable communication with the actuator. The light source is configured to produce a coherent light disposed in optical communication with the holographic encoded medium. The controller is operable to control synchronization of the coherent light from the light source with a position of the holographic encoded medium as driven by the actuator to produce the projected digital image on a projection surface based on directing the coherent light to different portions of the holographic pattern at different times.

18 Claims, 6 Drawing Sheets

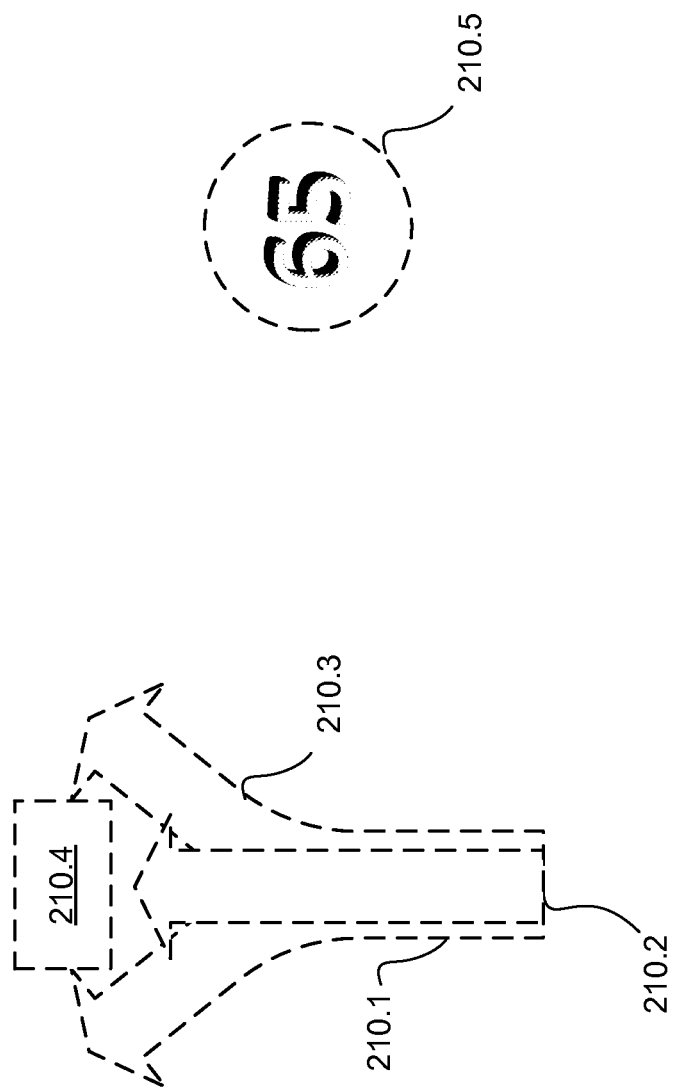

APPARATUS FOR DIGITAL PROJECTION USING HOLOGRAPHIC TECHNIQUES

FIELD OF THE INVENTION

The subject invention relates to an apparatus for generating and displaying a digital projection, and more particularly to an apparatus for generating and displaying a digital projection using holographic techniques.

BACKGROUND

The generation and display of visible light on a windshield of a vehicle is available on vehicles equipped with an enhanced vision system, such as a head-up display (HUD) system that provides an operator of a vehicle with information such as vehicle speed and/or navigation-related signals, or on vehicles equipped with a Reflected LED (light emitting diode) Alert Display (RLAD) that projects LED-source light onto the windshield of the vehicle if a vehicle sensor senses that the vehicle is too close to an object in front of it, for example. While existing enhanced vision systems for vehicles may be suitable for their intended purpose, the associated complexity, size and weight of such systems may have a less than desired impact on the overall vehicle appearance, and still may not provide some desired functionality. Accordingly, it is desirable to provide an apparatus for generating and displaying a projected digital image that overcomes these disadvantages.

SUMMARY OF THE INVENTION

In an exemplary embodiment of the invention, an apparatus for generating and displaying a projected digital image includes an actuator, a holographic encoded medium with a holographic pattern, a light source, and a controller. The holographic encoded medium is disposed in operable communication with the actuator. The light source is configured to produce a coherent light disposed in optical communication with the holographic encoded medium. The controller is operable to control synchronization of the coherent light from the light source with a position of the holographic encoded medium as driven by the actuator to produce the projected digital image on a projection surface based on directing the coherent light to different portions of the holographic pattern at different times.

Another exemplary embodiment of the invention is a method for generating and displaying a projected digital image from an apparatus. An actuator is enabled to move a holographic encoded medium including a holographic pattern. The holographic encoded medium is disposed in operable communication with the actuator. Coherent light is directed from a light source at a first time to synchronize with a first portion of the holographic encoded medium as driven by the actuator. The coherent light is directed from the light source at a second time to synchronize with a second portion of the holographic encoded medium as driven by the actuator. The projected digital image is produced on a projection surface based on directing the coherent light to different portions of the holographic pattern at different times.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIGS. 3 and 4 depict a plurality of projected digital images, in accordance with an embodiment of the invention;

DESCRIPTION OF THE EMBODIMENTS

Figure 1:
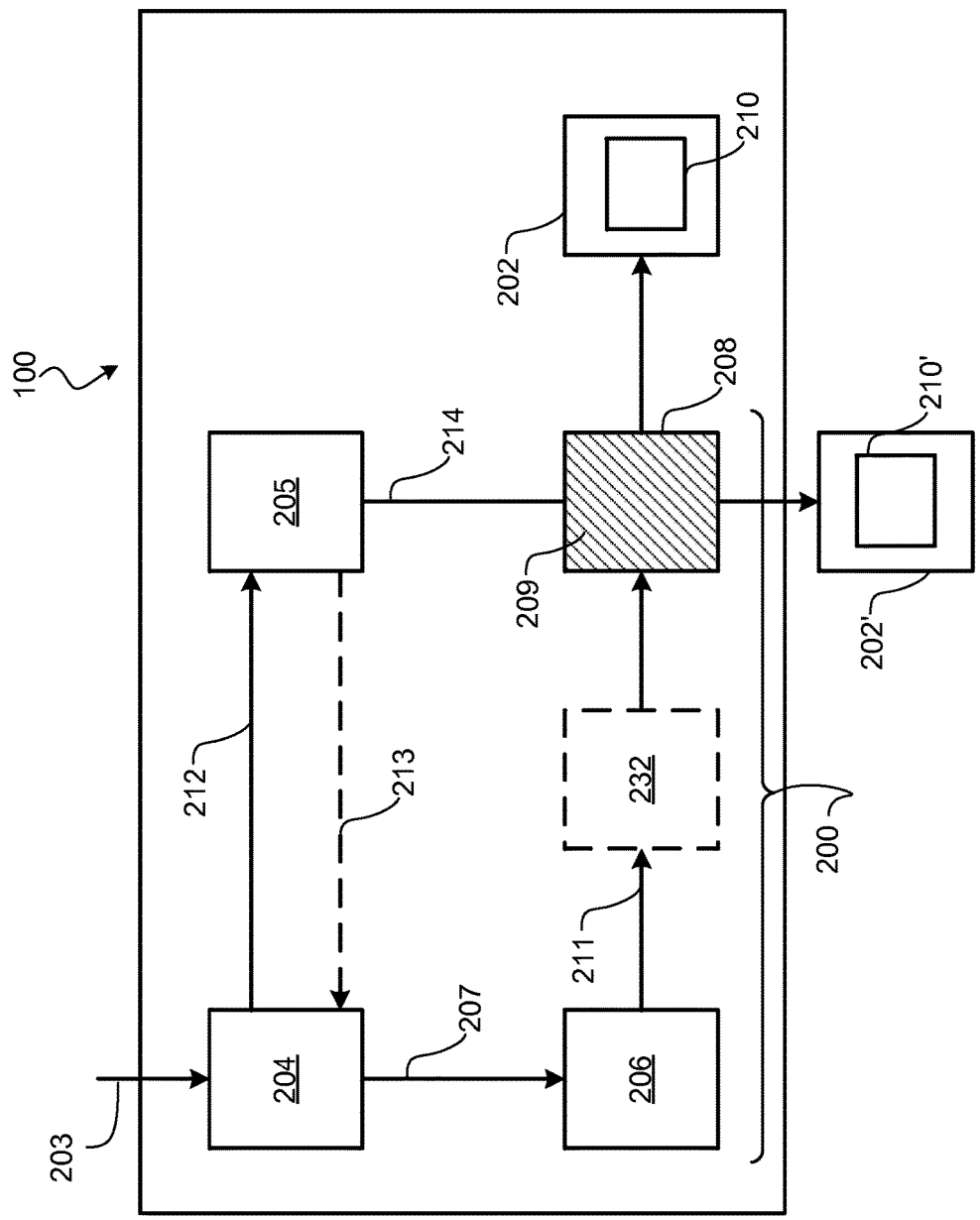
FIG. 1 depicts a block schematic diagram of a vehicle equipped with an apparatus configured to generate and display a projected digital image on a projection surface that is visible to an operator of the vehicle, in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention a vehicle is equipped with a holographic encoded medium that includes a holographic pattern. The holographic encoded medium is driven by an actuator to induce movement of the holographic pattern relative to a light source operable to direct coherent light at the holographic pattern. Coherent light refers to electromagnetic radiation that has a common frequency and phase, and may include any portion of the electromagnetic spectrum, such as visible or invisible light as well as other known forms of electromagnetic radiation. Control of the light source is synchronized with movement of the holographic encoded medium to direct coherent light at targeted portions of the holographic encoded medium at predetermined times such that illumination of the holographic pattern is controlled to produce a projected digital image on a projection surface. The holographic pattern can be distributed between a plurality of holographic elements on the holographic encoded medium with synchronization of the coherent light from the light source controlled on a per holographic element basis. The holographic elements can have a non-uniform size with irregular shapes configured to match one or more contours of the projection surface.

FIG. 1 depicts in block diagram schematic form a vehicle 100 equipped with an apparatus 200 configured to generate and display a projected digital image on a projection surface 202, 202' that may be visible to an operator of the vehicle 100. Projection surface 202 represents a surface that is part of the vehicle 100, while projection surface 202' represents a surface that is external to and not part of the vehicle 100, which will be discussed in more detail below. While the exemplary description of the apparatus 200 is with respect to the vehicle 100, it will be understood that the apparatus 200 can be used in other non-vehicular environments.

In an embodiment, the apparatus 200 includes a controller 204, an actuator 205, a light source 206 productive of coherent light 211 disposed in operable communication with the actuator 205, and a holographic encoded medium 208 disposed in optical communication with the light source 206, the holographic encoded medium 208 including a holographic pattern 209. The actuator 205 can be any type of device operable to control movement of the holographic encoded medium 208, including a motor or non-motor based device, such as a memory metal device, a piezoelectric device, and the like. The controller 204 is operable to control synchronization of the coherent light 211 from the light source 206 with a position of the holographic encoded medium 208 as driven by the actuator 205 to produce a projected digital image 210, 210' on a projection surface 202, 202' based on directing the coherent light 211 to different portions of the holographic pattern 209 at different times. In an embodiment, the controller 204 drives a pulse control signal 207 to the light source 206 to control synchronization of the coherent light 211 with the holographic encoded medium 208. The controller 204 provides at least one control signal 212 to the actuator 205 to enable and control movement of the holographic encoded medium 208 operably connected to the actuator 205 at coupling 214. The controller 204 can also receive a feedback signal 213 from the actuator 205 to support a feedback control loop. The feedback signal 213 can provide a position or velocity associated with the actuator 205 and/or the holographic encoded medium 208.

For discussion purposes, reference will be made herein to a projected digital image 210 on a projection surface 202 when the prevailing discussion is directed to a projection surface that is part of the vehicle 100, reference will be made herein to a projected digital image 210' on a projection surface 202' when the prevailing discussion is directed to a projection surface that is external to and not part of the vehicle 100, and reference will be made herein to a projected digital image 210, 210' on a projection surface 202, 202' when the prevailing discussion could be applicable to either a projection surface that is part of the vehicle 100 or a projection surface that is external to and not part of the vehicle 100. In an embodiment, the light source 206 productive of coherent light is a laser. However, it will be appreciated that coherent light may be produced by other light sources. All such light sources productive of coherent light are considered within the scope of the invention as disclosed herein.

In an embodiment, the projected digital image 210, 210' may be a non-homogeneous light pattern, an outline of a geometric shape, a logo, one or more alphanumeric characters, an image of any kind, a shape of any kind, or any combination of the foregoing light patterns, and may be stationary or non-stationary and animated, which will be discussed further below. Furthermore, the projected digital image 210, 210' may be two-dimensional (2D), three-dimensional (3D), two-dimensional and movable in time (psuedo-3D), or three-dimensional and movable in time (4D), as will be appreciated from the description below. Here, animation refers to updates to instances or frames of the projected digital image 210, 210' that make it appear to change over a period of time, where the animation itself may remain at fixed position or move in position.

Figure 2:
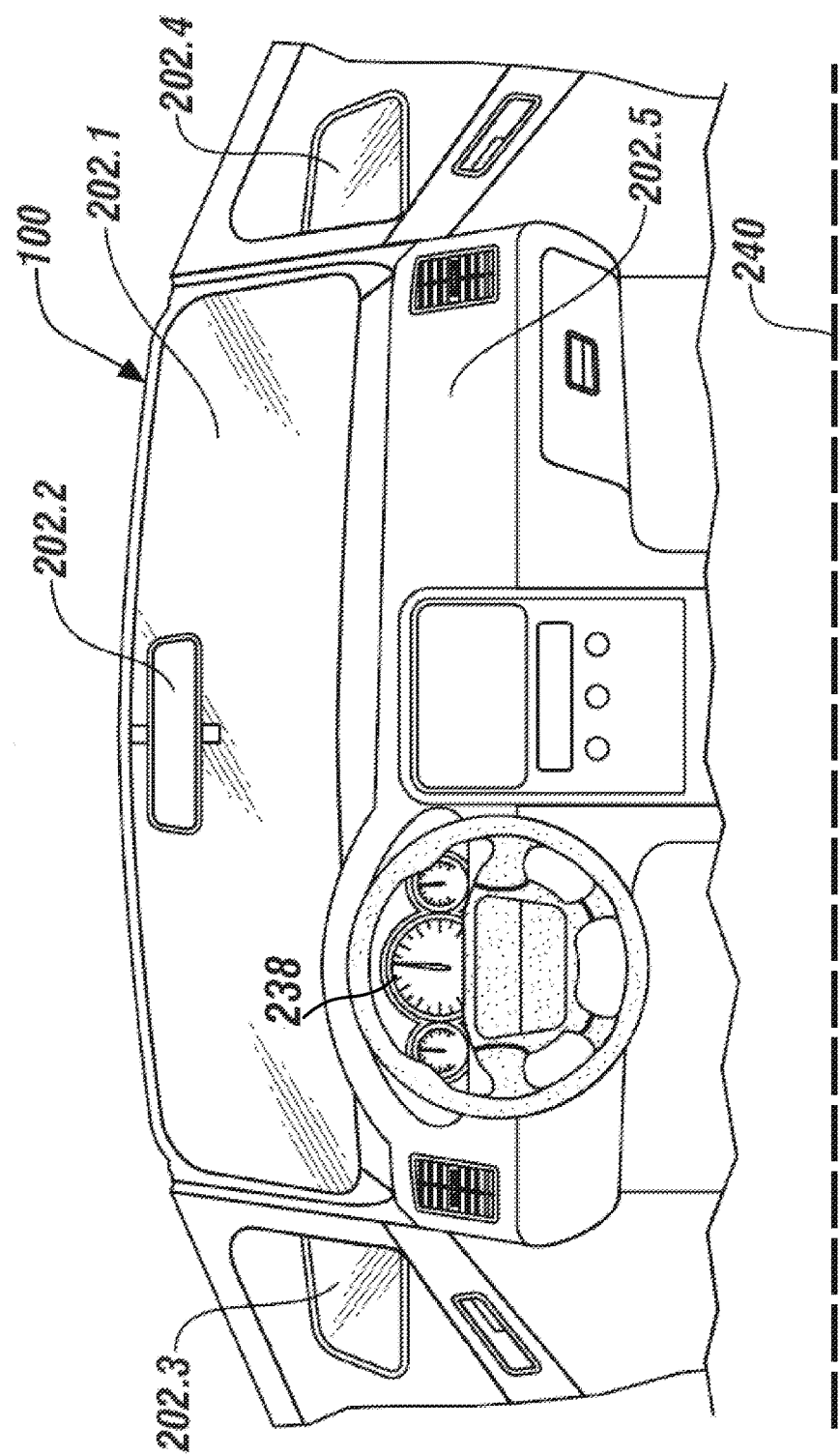
FIG. 2 depicts a portion of the vehicle of FIG. 1 illustrating various projection surfaces, in accordance with an embodiment of the invention.

In an embodiment, and with reference to FIG. 1 and FIG. 2, the projection surface 202 may be an interior surface of a windshield 202.1 of the vehicle 100, a rear view mirror 202.2 of the vehicle 100, a left side view mirror 202.3 of the vehicle 100, a right side view mirror 202.4 of the vehicle 100, or an interior surface 202.5 of the vehicle 100. In an embodiment, the interior surface 202.5 may be a dashboard or a rear window of the vehicle 100, but could be any other surface of the vehicle 100 useful for a purpose disclosed herein, such as an instrument panel 238. The projection surface 202, 202' is disposed relative to the light source 206 and holographic encoded medium 208 such that light originating from the light source 206 is reflected off of the projection surface 202, 202' and may be visible to an operator of the vehicle 100. In one embodiment, the projection surface 202' is the ground 240 outside of the vehicle 100, for example, to illuminate an expected trajectory of the vehicle 100 during a parking maneuver.

As discussed above, the projected digital image 210, 210' may take on different forms, but it may also alternate between different forms, and it may intermittently, simultaneously or consecutively display the same form or alternate forms at different time intervals. For example, and with reference now to FIG. 1 and FIG. 3, when the apparatus 200 is used for navigation or driving assistance, the projected digital image 210, 210' may be a left turn arrow 210.1, a straight arrow 210.2, or a right turn arrow 210.3, where display of a particular arrow 210.1-210.3 can be determined based on vehicle state information 203, (e.g., navigation system data or parking assistance data) received at the controller 204. The projected digital image 210, 210' may also include an information region 210.4 to indicate estimated distances, street names, landmarks, highlighted features, or other information. In an embodiment, the apparatus 200 is operable to produce any of the arrows 210.1-210.3 individually, either fixed, animated or flashing. In another embodiment the projected digital image 210, 210' may vary in time from a large pattern to a small pattern, or vice versa, with any number of intermediate sized patterns being displayed in between in a succession of images from the first size to the second size.

While embodiments disclosed herein refer to a particular geometric shape for the projected digital image 210, 210', such as those illustrated in FIG. 3 as the arrows 210.1-210.3 for example, it will be appreciated that such reference is for discussion purpose only and that the scope of the invention is not limited to only the particular shape mentioned. Alternative shapes and sizes to those discussed herein are contemplated and considered to be within the scope of the disclosed invention. While embodiments disclosed herein refer to only three arrows 210.1-210.3, it will be appreciated that such reference is for discussion purposes only and that the scope of the invention is not limited to only three projected digital images, but encompasses any number of light patterns suitable for a purpose disclosed herein.

As a further example of the projected digital image 210, FIG. 4 depicts a projected display gauge 210.5 on the instrument panel 238 (FIG. 2). The apparatus 200 can be used to provide the projected display gauge 210.5 for a single gauge or multiple gauges on the instrument panel 238. In one embodiment, the projected display gauge 210.5 is a speedometer. In another embodiment, the projected display gauge 210.5 is a vehicle health/status display. Although the projected display gauge 210.5 is depicted as a circular gauge, it will be understood that any shape or pattern can be applied that fits within space allotted to the instrument panel 238.

In an embodiment, it is contemplated that a defined structural feature associated with the windshield 202.1 (FIG. 2) may be utilized to create the projected digital image 210 by taking advantage of known refractive and reflective indices associated with the defined structural feature. Example structural features associated with the windshield 202.1 for a purpose disclosed herein include but are not limited to: the type, amount, orientation and/or spacing of fibers embedded within a glass version of the windshield 202.1; the type, amount, orientation and/or spacing of nanoparticles embedded within the windshield 202.1; the type amount, orientation and/or spacing of a reflective layer embedded within or disposed upon an outer surface of the windshield 202.1; or, one or more contours of the windshield 202.1.

In an embodiment, the controller 204 (FIG. 1) is in signal communication with the actuator 205, the light source 206, and one or more other systems providing vehicle state information 203. In an embodiment, a control algorithm executed by the controller 204 is operative to create the projected digital image 210, 210' responsive to a detected state change of the vehicle 100, as may be indicated by vehicle state information 203, and in accordance with other embodiments disclosed herein.

Furthermore, by utilizing the controller 204 to change the position of holographic encoded medium 208 relative to the light source 206, coupled with one of the aforementioned defined structural features of the windshield 202.1, it is contemplated that the projected digital image 210 may be created. It is further contemplated that colors and intensities of the projected digital image 210, 210' can be controlled by adding or removing light sources 206 in combination with corresponding instances of the holographic encoded medium 208 as separate holographic channels for each light source 206.

Figure 5:
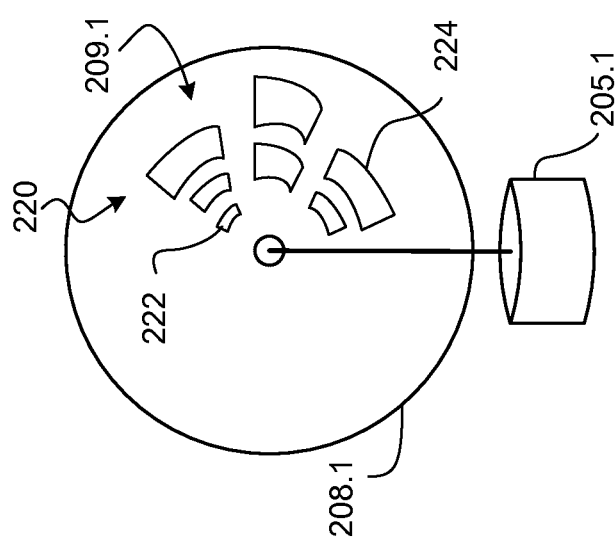
FIG. 5 depicts an example of a holographic encoded medium and an actuator, in accordance with an embodiment of the invention.

FIG. 5 depicts an example of a holographic encoded medium 208.1 and an actuator 205.1 in accordance with an embodiment of the invention. In the embodiment of FIG. 5, the holographic encoded medium 208.1 is an optical disk, and the actuator 205.1 is a motor operable to spin the optical disk. The actuator 205.1 can be a direct current (DC) motor, such as a hard-drive motor, controlled by the controller 204 of FIG. 1. The holographic encoded medium 208.1 includes a holographic pattern 209.1 operable to create a projected digital image 210, 210' in combination with the light source 206 and the controller 204 of FIG. 1. The holographic pattern 209.1 can be encoded onto the holographic encoded medium 208.1 using known holographic pattern creation techniques.

In the example of FIG. 5, the holographic encoded medium 208.1 includes a plurality of holographic elements 220. The holographic elements 220 are defined in predetermined positions and with a predetermined shape based on characteristics of the projected digital image 210, 210' and the projection surface 202, 202'. The holographic pattern 209.1 is distributed across the holographic elements 220 such that each of the holographic elements 220 may form a complete image frame or a portion of the projected digital image 210, 210'. As can be seen in FIG. 5, each of the holographic elements 220 may have a non-uniform size with irregular shapes configured to match one or more contours of the projection surface 202, 202'. Note that the holographic elements 220 are not drawn to scale in FIG. 5 and may be exaggerated in size and shape to highlight that they need not be uniform in size and shape.

Timing pulsation of the light source 206 via pulse control signal 207 of FIG. 1 enables synchronization of the coherent light 211 with a desired one or more of the holographic elements 220 to collectively produce the projected digital image 210, 210'. For example, coherent light 211 from the light source 206 can be synchronized by the controller 204 of FIG. 1 at a first time to illuminate a first portion 222 of the holographic encoded medium 208.1, where the holographic encoded medium 208.1 is driven by the actuator 205.1 as controlled by the controller 204. The coherent light 211 from the light source 206 can also be synchronized by the controller 204 of FIG. 1 at a second time to illuminate a second portion 224 of the holographic encoded medium 208.1. Each of the holographic elements 220 may be targeted on an individual or group basis. As multiple holographic elements 220 are illuminated in a predetermined sequence, the projected digital image 210, 210' is reflected/refracted on the projection surface 202, 202'. Pulsation of the light source 206 of FIG. 1 and position control of the holographic encoded medium 208.1 is operable to be faster than a total number of elements or holographic elements 220 making up the projected digital image 210, 210' per human image persistence time, i.e., greater than about $1/25$ of a second per image frame for animation.

Figure 6:
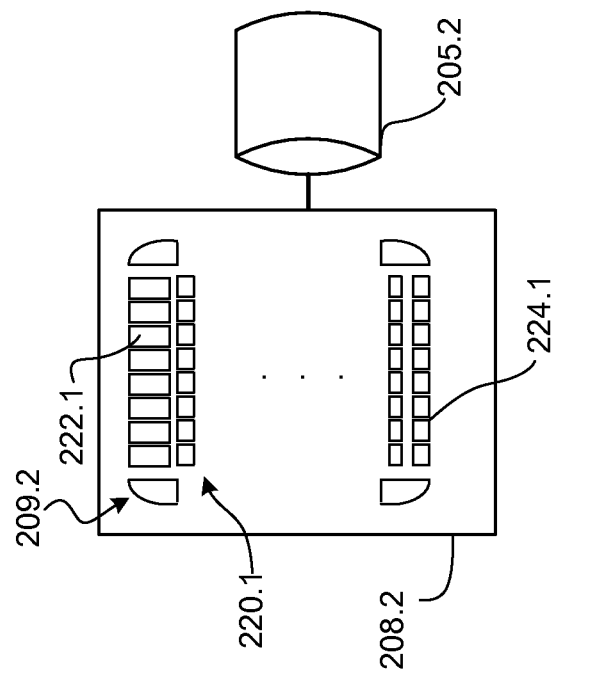
FIG. 6 depicts another example of a holographic encoded medium and an actuator, in accordance with an embodiment of the invention.

FIG. 6 depicts another example of a holographic encoded medium 208.2, and an actuator 205.2 in accordance with an embodiment of the invention. In the example of FIG. 6, the actuator 205.2 is a piezoelectric device operable to vibrate the holographic encoded medium 208.2. Vibration of the holographic encoded medium 208.2 can be controlled by at least one control signal 212 generated by the controller 204 of FIG. 1 to induce a controlled oscillating motion. Similar to the holographic encoded medium 208.1 of FIG. 5, the holographic encoded medium 208.2 includes a holographic pattern 209.2 distributed across holographic elements 220.1 such that each of the holographic elements 220.1 may form a complete image frame or a portion of the projected digital image 210, 210'. As can be seen in FIG. 6, each of the holographic elements 220.1 may have a non-uniform size with irregular shapes configured to match one or more contours of the projection surface 202, 202'. Note that the holographic elements 220.1 are not drawn to scale in FIG. 6 and may be exaggerated in size and shape to highlight that they need not be uniform in size and shape.

Timing pulsation of the light source 206 via pulse control signal 207 of FIG. 1 enables synchronization of the coherent light 211 with a desired one or more of the holographic elements 220.1 to collectively produce the projected digital image 210, 210'. For example, coherent light 211 from the light source 206 can be synchronized by the controller 204 of FIG. 1 at a first time to illuminate a first portion 222.1 of the holographic encoded medium 208.2, where the holographic encoded medium 208.2 is driven by the actuator 205.2 as controlled by the controller 204. The coherent light 211 from the light source 206 can also be synchronized by the controller 204 of FIG. 1 at a second time to illuminate a second portion 224.1 of the holographic encoded medium 208.2. Each of the holographic elements 220.1 may be targeted on an individual or group basis. As multiple holographic elements 220.1 are illuminated in a predetermined sequence, the projected digital image 210, 210' is reflected/refracted on the projection surface 202, 202'.

Figure 7:
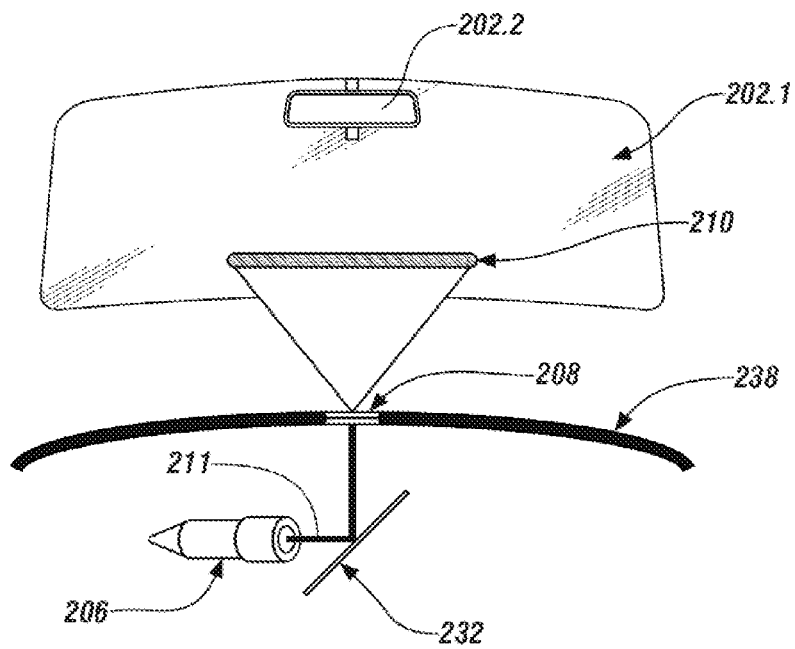
FIG. 7 depicts a schematic diagram of a portion of the vehicle of FIG. 1, in accordance with an embodiment of the invention.

With reference now back to FIG. 1, an embodiment of the invention includes a reflective surface 232, such as a mirror for example, disposed between the light source 206 and the holographic encoded medium 208, such that light from the light source 206 is reflected off of the reflective surface 232 and directed to the holographic encoded medium 208 for projection onto the projection surface 202, 202'. By utilizing a reflective surface 232, the light source 206 can be conveniently located within the vehicle 100, such as behind the instrument panel 238 of the vehicle 100 for example, best seen with reference to FIG. 7. The reflective surface 232 could also be located behind the instrument panel 238, such that light from the light source 206 would originate from behind the instrument panel 238, be redirected via the reflective surface 232, and be transformed to a projected image as it passes through the holographic encoded medium 208, and out through instrument panel 238, for display onto the desired projection surface 202, 202', such as the windshield, the frit (black out area around the perimeter of the windshield), or surfaces near the windshield 202.1, for example.

Figure 8:
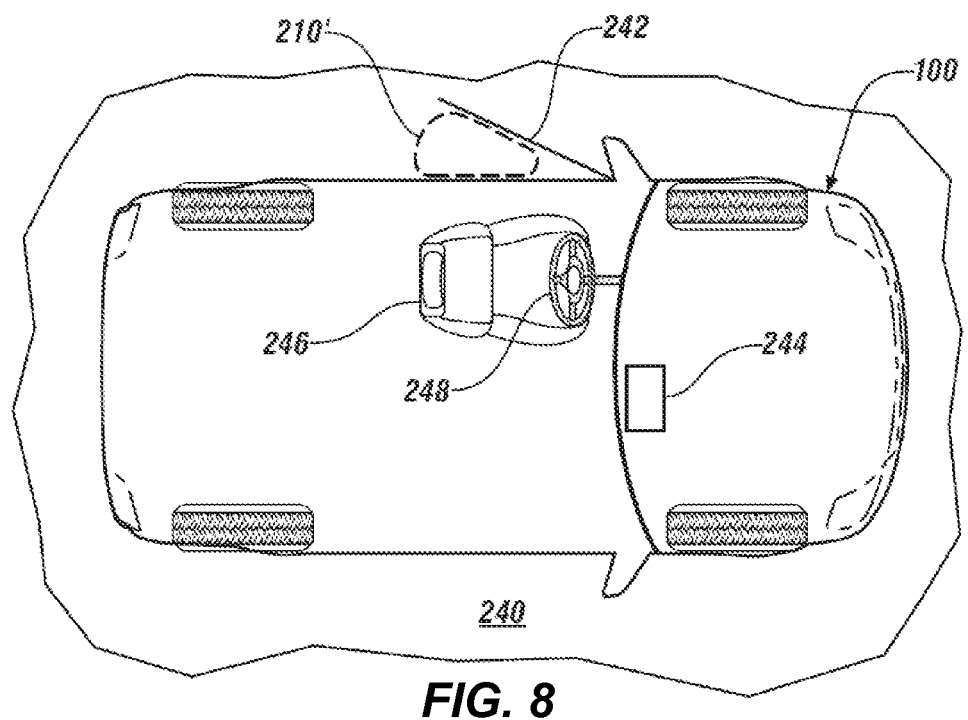
FIG. 8 depicts a schematic diagram of the vehicle of FIG. 1 illustrating various components of the vehicle operable in accordance with an embodiment of the invention.

From foregoing discussions directed to projection surface 202' representing a surface that is external to and not part of the vehicle 100, and with reference now to FIG. 8 in combination with FIGS. 1 and 2, it will be appreciated that a predefined light pattern 210' may be projected onto the ground 240 upon which the vehicle 100 is disposed at the time. In this configuration, the apparatus 200 could be responsive to a door 242 of the vehicle 100 being open, based on a door switch, for example. The projected digital image 210' could be a non-coherent light that illuminates the ground 240 near the open door 242 to display a particular image outside of the vehicle 100 such as a manufacturer's logo, an indicator, or a warning icon of any type, for example. The apparatus 200 may be operable to produce the projected digital image 210' on the projection surface 202' in response to the door 242 of the vehicle 100 being open as a detected state change of the vehicle 100, e.g., as indicated by vehicle state information 203.

In an embodiment, the apparatus 200 may be configurable via a user interface 244 of the vehicle 100, such as an infotainment unit for example, that can enable a user to select one or more projected digital image 210, 210' to display and conditions when the one or more projected digital image 210, 210' is to be displayed. The user interface 244 may be in close proximity to a driver's seat 246 for ease of configuration and adjustment. In an alternate embodiment, the user interface 244 is integrated in whole or in part in a steering wheel 248 of the vehicle 100.

While embodiments have been described herein with reference to a light source 206 and a holographic encoded medium 208, it will be appreciated that multiple light sources 206 and/or holographic encoded medium 208 may be employed together in a single vehicle 100, and that one or more of the aforementioned reflective surface 232 may be utilized to direct or redirect light from a respective light source 206 to a respective holographic encoded medium 208 to produce a multitude of projected digital images 210, 210' on respective projection surfaces 202, 202', in accordance with the disclosure provided herein.

While embodiments have been described herein with reference to an apparatus 200 that produces a projected digital image 210, 210' for navigational and parking assistance uses in a vehicle 100, it will be appreciated that the same apparatus 200 may be used for other purposes, such as informational messaging or entertainment, for example. In an embodiment, the apparatus 200 in conjunction with an audio system of the vehicle 100 may be employed to generate audio in addition to a projected digital image 210, 210' that ranges from factory-loaded messages to personalized/programmable messages aimed toward customized presentations. For example, information or alerts may be presented both visually and audibly on an interior or exterior surface of the vehicle 100 or the exterior ground, or entertainment may be provided both visually and audibly in the form of music with a repetitive display of logos or icons on an interior or exterior surface of the vehicle 100 or the exterior ground. The utility of apparatus 200 for such purposes is contemplated and considered within the scope of the invention disclosed herein.

Figure 9:
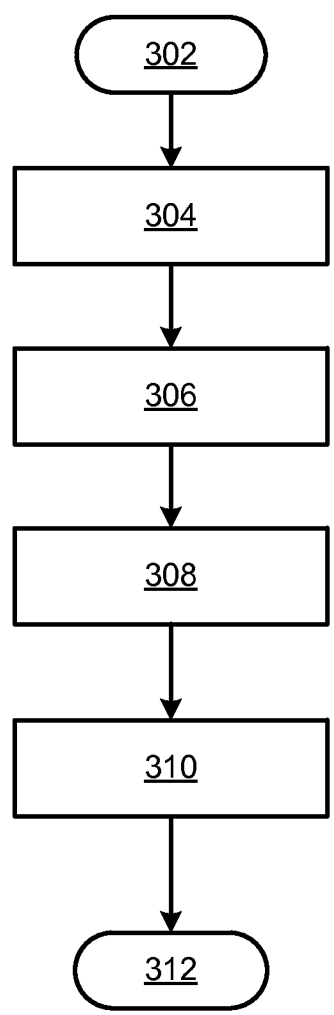
FIG. 9 is a process flow diagram illustrating a method of generating and displaying a projected digital image from an apparatus disposed in a vehicle, in accordance with an embodiment of the invention.

FIG. 9 is a process flow diagram illustrating a method 300 of generating and displaying a projected digital image 210, 210' from an apparatus 200 disposed in a vehicle 100 in accordance with an embodiment of the invention. Accordingly, the method 300 is described in reference to FIGS. 1-9. As can be appreciated in light of the disclosure, the order of operations within the method 300 is not limited to the sequential execution as illustrated in FIG. 9, but may be performed in one or more varying orders as applicable and in accordance with the present disclosure. As can further be appreciated, one or more steps may be added or removed without altering the spirit of the method.

Method 300 begins at block 302 and can be performed periodically when the apparatus 200 is enabled or responsive to a detected state change of the vehicle 100 to produce a projected digital image 210, 210' on a projection surface 202, 202'.

At block 304, an actuator 205 disposed in the vehicle 100 is enabled to move a holographic encoded medium 208 that includes a holographic pattern 209. The holographic encoded medium 208 is disposed in operable communication with the actuator 205. The holographic encoded medium 208 can be an optical disk, e.g., holographic encoded medium 208.1, and the actuator 205 may be a motor operable to spin the optical disk, e.g., actuator 205.1. In another embodiment, the actuator 205 is a piezoelectric device, e.g., actuator 205.2, operable to vibrate holographic encoded medium 208.2.

At block 306, coherent light 211 is directed from a light source 206 at a first time to synchronize with a first portion 222, 222.1 of the holographic encoded medium 208 as driven by the actuator 205. Where the light source 206 is a laser, pulse controlling the laser 206 can be performed to control synchronization of the coherent light 211 with the holographic encoded medium 208.

At block 308, the coherent light 211 is directed from the light source 206 at a second time to synchronize with a second portion 224, 224.1 of the holographic encoded medium 208 as driven by the actuator 205. The first portion 222, 222.1 and the second portion 224, 224.1 of the holographic encoded medium 208 may correspond to different holographic elements 220, 220.1 where the holographic pattern 209 is distributed between a plurality of holographic elements 220, 220.1 on the holographic encoded medium 208, and controlling synchronization of the coherent light 211 from the light source 206 is performed on a per holographic element basis. As previously described in reference to FIGS. 5 and 6, the holographic elements 220, 220.1 may have a non-uniform size with irregular shapes configured to match one or more contours of the projection surface 202, 202'.

At block 310, the projected digital image 210, 210' is produced on a projection surface 202, 202' based on directing the coherent light 211 to different portions of the holographic pattern 209 at different times. The projected digital image 210, 210' may be a non-homogeneous light pattern, an outline of a geometric shape, a logo, an alphanumeric character, or any combination of the foregoing light patterns. Additionally, the projected digital image 210, 210' can be projected as an animated image including light patterns changing over a period of time. The projection surface 202, 202' can be at least one of a windshield 202.1 of the vehicle 100, a rear view mirror 202.2 of the vehicle 100, a side view mirror 202.3, 202.4 of the vehicle 100, an interior surface 202.5 of the vehicle 100, or a surface exterior to the vehicle 100 such as the ground 240. The method 300 ends at block 312.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An apparatus for generating and displaying a projected digital image, the apparatus comprising:
   an actuator;
   a holographic encoded medium comprising a holographic pattern distributed between a plurality of holographic elements of the holographic encoded medium, the holographic encoded medium disposed in operable communication with the actuator;
   a light source configured to produce a coherent light disposed in optical communication with the holographic encoded medium; and
   a controller operable to control synchronization of pulsation of the coherent light from the light source with a position of the holographic encoded medium on a per holographic element basis, the holographic encoded medium driven in motion by the actuator to produce the projected digital image on a projection surface based on directing the coherent light to different portions of the holographic pattern at different times in a predetermined sequence of illumination of the holographic encoded medium by the coherent light that reflects/refracts the coherent light onto the projection surface, wherein directing the coherent light to different portions of the holographic pattern at different times comprises directing the coherent light from the light source at a first time to synchronize pulsation of the coherent light with a first portion of the holographic encoded medium and directing the coherent light from the light source at a second time to synchronize pulsation of the coherent light with a second portion of the holographic encoded medium based on the actuator driving the holographic encoded medium in motion.

2. The apparatus of claim 1, wherein the holographic elements have a non-uniform size with irregular shapes configured to match one or more contours of the projection surface.

3. The apparatus of claim 1, wherein the light source comprises a laser, and the controller is operable to pulse control the laser to control synchronization of the coherent light with the holographic encoded medium.

4. The apparatus of claim 1, wherein the actuator and the controller are operable in response to a detected state change of a vehicle.

5. The apparatus of claim 1, wherein the holographic encoded medium is an optical disk, and the actuator is a motor operable to spin the optical disk.

6. The apparatus of claim 1, wherein the actuator is a piezoelectric device operable to vibrate the holographic encoded medium.

7. The apparatus of claim 1, wherein the projected digital image comprises a non-homogeneous light pattern, an outline of a geometric shape, a logo, an alphanumeric character, or any combination of the foregoing light patterns.

8. The apparatus of claim 1, wherein the holographic pattern and the controller are configured to produce the projected digital image as an animated image comprising light patterns changing over a period of time.

9. The apparatus of claim 1, wherein the apparatus is disposed in a vehicle and the projection surface comprises at least one of a windshield of the vehicle, a rear view mirror of the vehicle, a side view mirror of the vehicle, an interior surface of the vehicle, or a surface exterior to the vehicle.

10. A method for generating and displaying a projected digital image from an apparatus, comprising:
    enabling an actuator to move a holographic encoded medium comprising a holographic pattern distributed between a plurality of holographic elements of the holographic encoded medium, the holographic encoded medium disposed in operable communication with the actuator;
    directing a coherent light from a light source at a first time to synchronize pulsation of the coherent light with a first portion of the holographic encoded medium on a per holographic element basis as driven in motion by the actuator;
    directing the coherent light from the light source at a second time to synchronize pulsation of the coherent light with a second portion of the holographic encoded medium on the per holographic element basis as driven in motion by the actuator; and
    producing the projected digital image on a projection surface based on directing pulsation of the coherent light to different portions of the holographic pattern at different times in a predetermined sequence of illumination of the holographic encoded medium by the coherent light that reflects/refracts the coherent light onto the projection surface.

11. The method of claim 10, wherein the holographic elements have a non-uniform size with irregular shapes configured to match one or more contours of the projection surface.

12. The method of claim 10, wherein the light source comprises a laser, and the method further comprises pulse controlling the laser to control synchronization of the coherent light with the holographic encoded medium.

13. The method of claim 10, wherein producing the projected digital image on the projection surface is performed responsive to a detected state change of a vehicle.

14. The method of claim 10, wherein the holographic encoded medium is an optical disk, and the actuator is a motor operable to spin the optical disk.

15. The method of claim 10, wherein the actuator is a piezoelectric device operable to vibrate the holographic encoded medium.

16. The method of claim 10, wherein the projected digital image comprises a non-homogeneous light pattern, an outline of a geometric shape, a logo, an alphanumeric character, or any combination of the foregoing light patterns.

17. The method of claim 10, wherein the projected digital image is projected as an animated image comprising light patterns changing over a period of time.

18. The method of claim 10, wherein the apparatus is disposed in a vehicle and the projection surface comprises at least one of a windshield of the vehicle, a rear view mirror of the vehicle, a side view mirror of the vehicle, an interior surface of the vehicle, or a surface exterior to the vehicle.

* * * * *